United States Patent
Estrada et al.

(10) Patent No.: US 6,803,688 B2
(45) Date of Patent: Oct. 12, 2004

(54) ISOLATION OF GENERATOR BEARING HOUSING FROM GENERATOR ENCLOSURE AND METHODS THEREFOR

(75) Inventors: Luis Alberto Estrada, Clifton Park, NY (US); Christopher Steven Terrey, Albany, NY (US); David Robert Kettlewood, East Greenbush, NY (US)

(73) Assignee: General Electric Company, Schenectady, NY (US)

( * ) Notice: Subject to any disclaimer, the term of this patent is extended or adjusted under 35 U.S.C. 154(b) by 90 days.

(21) Appl. No.: 10/208,209

(22) Filed: Jul. 31, 2002

(65) Prior Publication Data

US 2004/0021380 A1 Feb. 5, 2004

(51) Int. Cl.[7] .............................................. H02K 5/124
(52) U.S. Cl. .......................................... 310/90; 310/55
(58) Field of Search .............................. 310/90, 57, 58, 310/55

(56) References Cited

U.S. PATENT DOCUMENTS

| | | | | |
|---|---|---|---|---|
| 3,091,710 A | * | 5/1963 | Shartrand et al. ............. | 310/57 |
| 3,348,081 A | * | 10/1967 | Willyoung ..................... | 310/55 |
| 3,441,758 A | * | 4/1969 | Albright et al. .............. | 310/58 |
| 3,466,478 A | | 9/1969 | Gail | |
| 3,571,635 A | * | 3/1971 | Turner ........................... | 310/59 |
| 3,623,573 A | * | 11/1971 | Csanady et al. ............... | 184/6 |
| 3,663,077 A | | 5/1972 | Nakamura et al. | |
| 4,080,535 A | * | 3/1978 | Phillips et al. ............... | 250/381 |
| 4,264,834 A | * | 4/1981 | Armor et al. .................. | 310/59 |
| 4,644,210 A | | 2/1987 | Meisner et al. | |
| 4,844,625 A | | 7/1989 | Katsuzawa et al. | |
| 4,883,995 A | * | 11/1989 | Rink, Jr. ........................ | 310/55 |
| 5,186,277 A | * | 2/1993 | Snuttjer et al. ............. | 184/6.22 |
| 5,322,373 A | | 6/1994 | Oakes et al. | |
| 5,548,174 A | * | 8/1996 | Siga et al. .................... | 310/261 |
| 6,082,740 A | | 7/2000 | Jones et al. | |

FOREIGN PATENT DOCUMENTS

| | | | | |
|---|---|---|---|---|
| JP | 9182377 A | * | 7/1977 | |
| JP | 355103055 A | * | 8/1980 | |
| JP | 357003555 A | * | 1/1982 | |
| JP | 361293134 A | * | 12/1986 | |
| JP | 2002095202 A | * | 3/2002 | .......... H02K/5/124 |

* cited by examiner

*Primary Examiner*—Joseph Waks
(74) *Attorney, Agent, or Firm*—Nixon & Vanderhye P.C.

(57) ABSTRACT

The bearing housing of an electrical generator is isolated from the interior of the generator enclosure by forming a cavity in the generator end wall with a seal between the generator end wall and the rotor. By sealing the bearing housing from the interior of the enclosure, the bearing housing is subject entirely to ambient pressure while the interior of the generator is subject to high vacuum pressure for cooling purposes. This isolation minimizes or eliminates potential for oil leakage into the interior of the generator previously caused by exposure on one side of the bearing housing to high vacuum pressure within the generator enclosure and the opposite side to the ambient pressure. This isolation system also eliminates the need for a high suction pressure vapor extractor and enables a conventional vapor extractor associated with the lubrication oil system to remove oil vapors from the bearing housing.

5 Claims, 4 Drawing Sheets

ISOLATION OF GENERATOR BEARING HOUSING FROM GENERATOR ENCLOSURE AND METHODS THEREFOR

BACKGROUND OF THE INVENTION

The present invention relates to electrical generators having bearings for the rotor at opposite ends of the generator enclosure and particularly relates to apparatus and methods for isolating the bearing housing from the interior of the generator enclosure to preclude oil leakage into the generator.

Electrical generators are constructed with bearings for the rotor at opposite ends of the generator. Typically, one side of the bearing housing is partially enclosed by the generator enclosure and an opposite side of the bearing housing lies partially outside of the generator enclosure. Thus, approximately half of the bearing housing along the inside of the generator enclosure is exposed to the high suction pressure of a generator fan used for cooling the rotor. The other half of the bearing housing located outside the generator enclosure is exposed to atmospheric or ambient pressure. The oil in the bearing itself, which could be a tilt pad bearing or a plain journal bearing, is thus exposed to the high suction pressure and ambient pressure on opposite sides of the bearing housing. With the interior of the generator enclosure being at negative pressure, oil from the bearing can and does leak into the generator enclosure contaminating its interior. For example, oil leakage into the interior of the generator coats the internal surfaces of the generator with oil and compromises generator performance. Oil is also a magnet for dirt and dust which likewise compromises performance.

In prior generators of this type with half of the bearing housing exposed to interior vacuum pressure and the other half exposed to ambient pressure, a dedicated vapor extractor is typically provided to overcome the high suction pressure of the main generator internal cooling fan. That is, the pressure generated by the vapor extractor fan and the main generator fan are roughly comparable. Thus by providing a vapor extractor coupled to the bearing housing for example adjacent the internal oil deflector, oil vapors may be extracted from the bearing housing without leakage flows into the generator enclosure. Also, it will be appreciated that the vapor extractor requirements for the generator bearing housing are much higher than the requirements for the vapor extractor associated with the lubrication oil system typically applied to the generator bearing. Thus the two systems cannot be combined into one. Further the necessary vapor extractor requires precise setting of the vacuum and high maintenance for the system to operate satisfactorily. Because large quantities of oil vapor are drawn through the vapor extractor, frequent changes of filter media are also required. A system malfunction and vapor extractor motor overload with potential for shortening its life expectancy and premature failure can be predicted if maintenance is not performed as required.

In addition, the oil drain pipe on the bearing housings has been located at an elevation with respect to the bottom of the bearing cavity such that the high suction in the bearing housing will raise the oil level in the housing higher and above that necessary to drain the bearing cavity. This will cause backups and oil leaks into the generator past the oil deflectors. To remedy that situation, additional piping has been provided to apply an opposing vacuum on the bearing housing drain pipe.

BRIEF DESCRIPTION OF THE INVENTION

In accordance with a preferred embodiment of the present invention, there is provided a generator bearing housing isolated from the interior of the generator enclosure thereby enabling the bearing housing to lie wholly at ambient pressure while also enabling removal of oil vapors from the oil bearing cavity. To accomplish the foregoing and rather than physically relocating the bearing and bearing housing, the low pressure region within the generator enclosure is isolated from the bearing housing by creating a seal between the rotor and the end wall of the generator enclosure sealing between the low pressure region within the generator enclosure and ambient pressure outside the enclosure. This isolation of the bearing housing and the generator enclosure may be created by extending the end wall of the generator enclosure axially inwards and providing a seal, for example labyrinth seal teeth about the rotor. Consequently, the vacuum pressure within the generator enclosure is eliminated from the bearing housing. Any oil that may pass the inner oil deflector may accumulate in the lower portion of the deflector and drain back into the bearing cavity.

It is still important, however, to remove oil vapors from the bearing cavity to preclude those vapors from escaping from the housing. To accomplish this, the vapor extractor typically utilized with the oil lubrication system and which applies nominal vacuum pressure slightly below ambient pressure is used to suction the oil vapors from the bearing cavity. This eliminates the need for the vapor extractor which necessarily had to operate at low vacuum pressures comparable to the pressures within the generator enclosure to remove oil vapors from the bearing cavity. Additionally, the bearing housing drain pipe is relocated to a lowest possible elevation to reduce the amount of oil that accumulates in the bearing housing before it starts to drain out and thus the oil level is maintained as low as possible.

In a preferred embodiment according to the present invention, there is provided an electrical generator comprising a generator housing having a wall at one end of the generator, a rotor within the housing, a bearing at the one end of the generator for supporting one end of the rotor, the end wall including an axially inwardly directed cavity locating the bearing outside the generator housing and under ambient pressure.

In a further preferred embodiment according to the present invention, there is provided an electrical generator having a generator housing, a wall at one end of the housing, a rotor within the generator housing and extending through the wall at the one end of the housing, a lubrication oil system for the generator including an oil vapor extractor and a bearing for supporting the rotor adjacent the one end of the housing, a method of minimizing or eliminating oil leakage from the bearing into the generator housing comprising exposing the entire bearing to ambient pressure and employing a vapor extractor provided with a lubrication oil system to apply low suction pressure to the bearing cavity to withdraw oil vapors therefrom.

In a further preferred embodiment according to the present invention, there is provided in an electrical generator having a generator housing, a wall at one end of the housing, a rotor within the generator housing and extending through the wall, a fan within the housing for applying a high pressure suction to cool the rotor, and a bearing housing including a bearing for supporting the rotor adjacent the one end of the generator housing and lying partially within the generator housing at generator fan high suction pressure and partially outside the generator housing at ambient pressure, a method of minimizing or eliminating oil leakage from the bearing housing into the generator housing comprising the steps of isolating the bearing housing from the high suction pressure of the generator fan by providing a seal between (i)

the rotor adjacent the one end thereof and at a location axially inwardly of the bearing and (ii) the end wall thereby exposing the entirety of the bearing housing to ambient pressure.

DETAILED DESCRIPTION OF THE INVENTION

Figure 1:
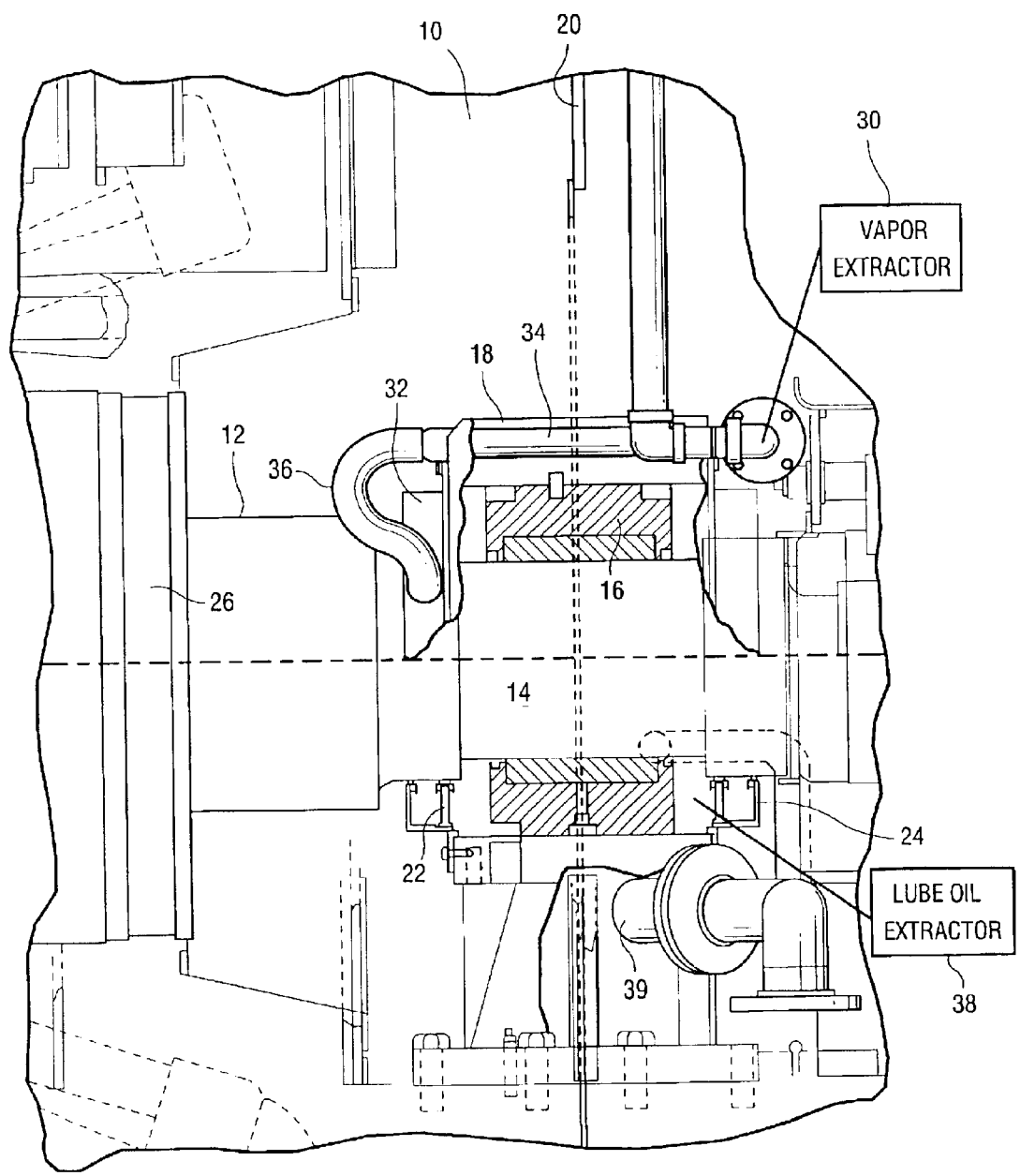
FIG. 1 is a schematic cross-sectional view of an end of an electrical generator illustrating a bearing and an end portion of a generator enclosure therefor according to the prior art.

Referring now to the drawings particularly to FIG. 1, there is illustrated a generator enclosure 10 housing a generator rotor 12 within the enclosure 10 and having a reduced diameter shaft end 14 passing through a bearing 16 in a bearing housing 18. The generator enclosure 10 includes an end wall 20. As illustrated in FIG. 1, the end wall 20 essentially bisects the bearing housing 18 with a portion of the bearing housing, to the left of the dashed line in FIG. 1 representing the end wall, being exposed to the pressure within the generator enclosure 10. The opposite half of bearing housing 18 to the right of the dashed lines in FIG. 1 is exposed to ambient pressure. Thus the inner and outer oil deflectors 22 and 24, respectively, are exposed to different pressures.

Figure 2:
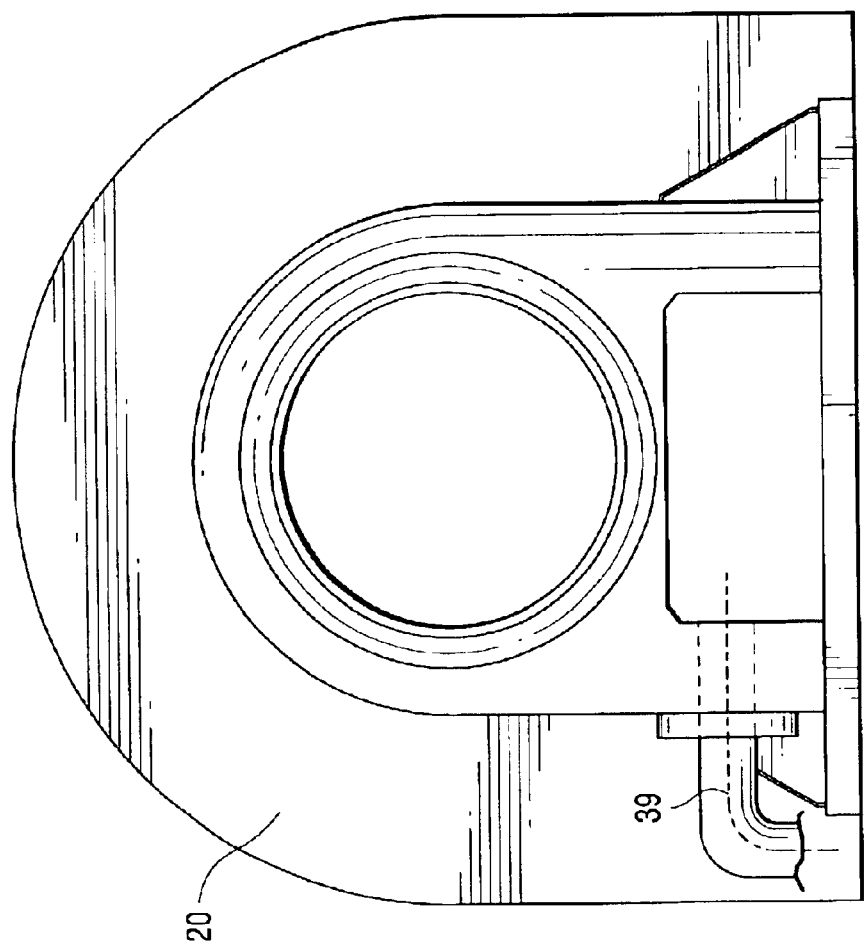
FIG. 2 is a schematic end elevational view of the generator enclosure.

In typical generators, a radial flow fan 26 is carried by the rotor 12 and provides high vacuum pressure within the generator enclosure 10 for purposes of cooling the rotor and ancillary parts. This highly negative pressure within the generator enclosure creates an oil leakage path from the oil bearing cavity within the bearing housing past the inner oil deflectors 22 and into the interior of the generator enclosure 10. Oil leakage into the generator is highly detrimental to generator performance. To minimize the potential for oil leakage into the generator enclosure 10, a vapor extractor 30 is provided to provide a suction pressure on the inner oil deflector 22 comparable to the high suction pressure within the generator housing 10 generated by fan 26. As illustrated in FIG. 1, the vapor extractor 30 suctions the annulus 32 about the inner oil deflector 22 via a piping and hose arrangement 34 and 36, respectively, interconnecting the annulus with the vapor extractor 30. Because the vapor extractor 30 must generate a sufficiently low vacuum pressure comparable to the vacuum within the enclosure 10, the lubrication oil extractor 38 cannot be utilized to extract vapors in the potential leakage paths into the interior of the generator enclosure caused by the differential pressure between opposite sides of the bearing housing. Lubrication oil extractor 38 operates at a vacuum pressure only slightly below ambient pressure. Additionally, in the prior generators, the oil drain pipe 39 (FIG. 2) is located at an elevation which is sufficiently high with respect to the bottom of the bearing cavity that the high suction in the bearing housing may raise the oil level in the bearing housing even higher and above that necessary to drain the bearing cavity. This causes oil backup and potential for leaks into the generator past the oil deflectors.

Figure 3:
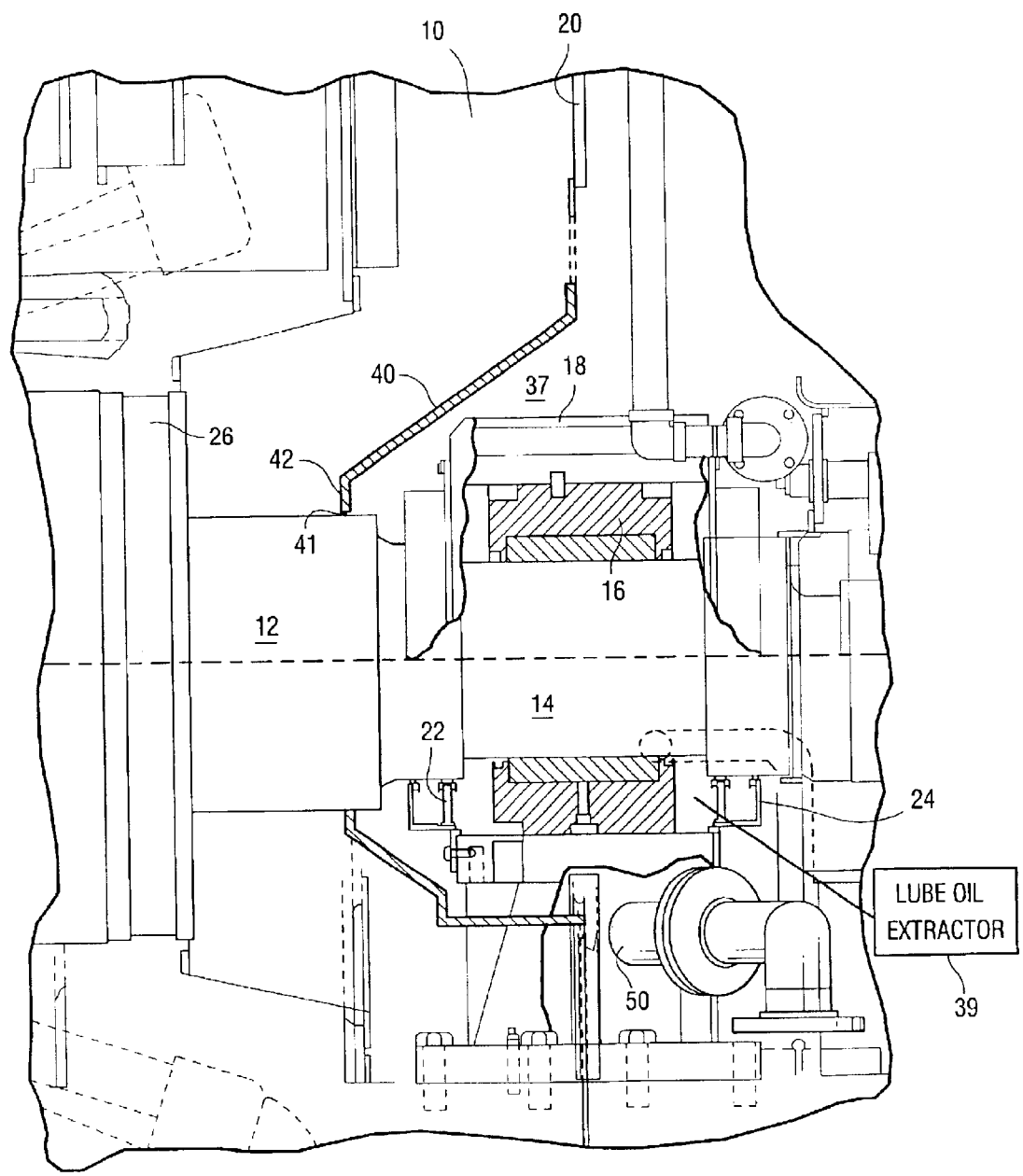
FIG. 3 is a view similar to FIG. 1 illustrating a bearing housing isolated from the interior of the generator enclosure according to a preferred embodiment of the present invention.

Referring now to FIG. 3, wherein like parts are identified by like reference numbers as in FIG. 1, the preferred embodiment of the present invention provides for an isolation of the bearing housing from the generator enclosure. That is, instead of having opposite sides of the bearing housing subject to ambient and high vacuum pressures respectively as in the prior art of FIG. 1, the bearing housing is isolated from the enclosure 10 such that the entirety of the bearing housing is subjected to ambient pressure. To accomplish the foregoing, a cavity 37 is formed in the end wall 20 of the generator enclosure 10. Particularly, a partition or wall 40, generally frustoconical in shape, is connected to the end wall 20. An enlarged opening is formed through the end wall 20 and the large end of the frustoconical partition 40 is secured to the margins of the opening. The reduced end of the partition 40 is disposed in sealing engagement about the rotor 12 axially inwardly of the bearing housing 18 by a seal 41. The sealing engagement at the inner end 42 of the partition 40 may comprise labyrinth teeth or any other type of seal effective to seal between the differential pressure regions on opposite sides of the partition wall. As a consequence of the seal and the partition wall, the bearing housing 18 is subjected wholly to ambient pressure since it lies outside the generator enclosure 10 albeit residing in a cavity of the generator enclosure end wall 20. It will be appreciated that because the oil vapors in the inner oil deflector 22 are not subject to high vacuum pressure, the necessity for a vapor extractor, i.e. the vapor extractor 30 (FIG. 1), is entirely eliminated. Instead, because of the substantially ambient pressure within the bearing cavity, the vapor extractor 38 which forms part of the lubrication oil extraction system and typically provided for the generator bearings can be used to provide a slight vacuum pressure to the oil vapor within the bearing housing. That slight vacuum pressure is sufficient to remove the oil vapors and prevent them from escaping from the housing into the environment.

Figure 4:
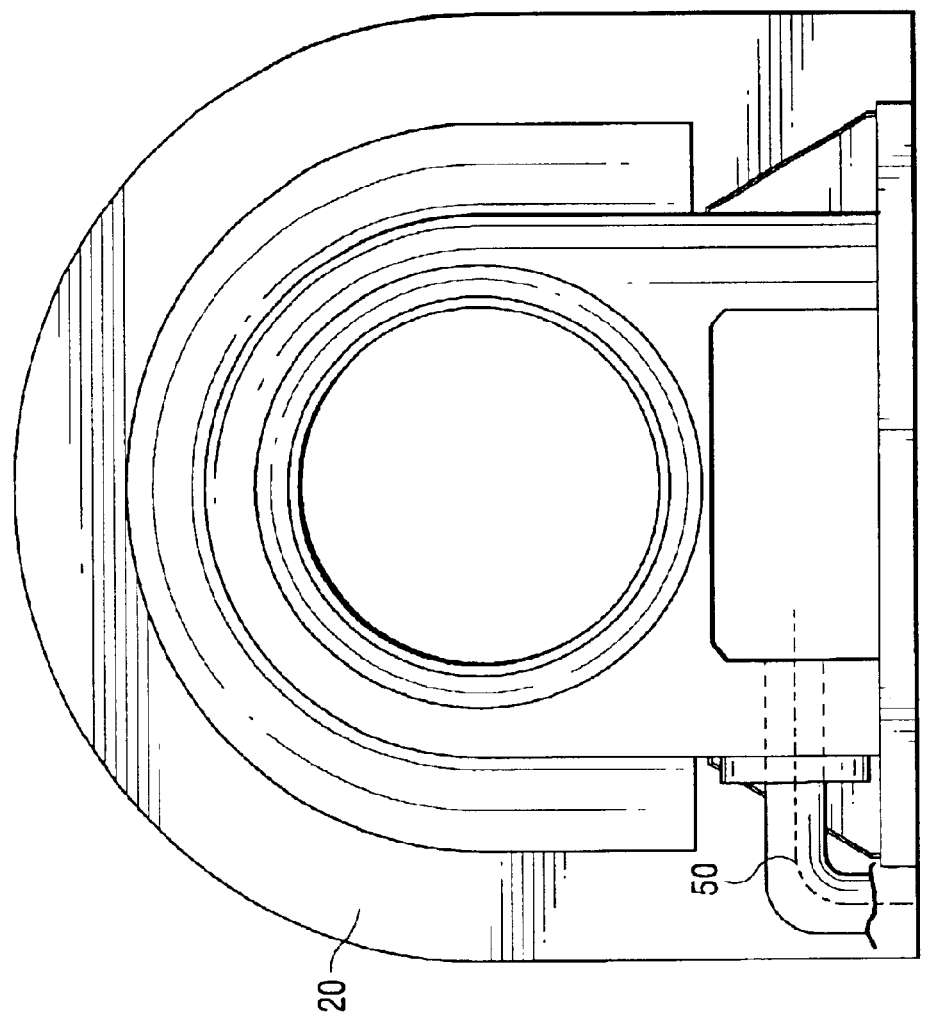
FIG. 4 is an schematic end elevational view of the generator enclosure end of FIG. 3 illustrating a lowered drain pipe.

Additionally and as illustrated in FIG. 4, the drain pipe 50 on the bearing housing is moved to a lower elevation as compared with the elevation of the drain pipe 39 of FIG. 1. This reduces the amount of oil that accumulates in the bearing housing before the oil starts to drain out thereby maintaining the oil level in the housing at as low a level as possible.

It will be appreciated that the present isolation system may be utilized in original equipment manufacture of new generators. Also and importantly the isolation system hereof may be used to retrofit generators in service. Thus generators in the field can be readily serviced to include a partition wall isolating the bearing housing from the interior of the generator enclosure. The previously necessary vapor extractor 40 can be disconnected and removed. Additionally, the drain pipe can be relocated at a lower elevation within the bearing housing to maintain as little oil as possible within the bearing housing. In this manner, generators may be retrofit with the present vapor sealing and isolation system hereof whereby the cost of separate extractors and operating/maintenance costs are significantly reduced and a more robust design is provided.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In an electrical generator having a generator housing, a wall at one end of the housing, a rotor within the generator housing and extending through said wall, a fan within the housing for applying a high pressure suction to cool the rotor, and a bearing housing including a bearing for supporting the rotor adjacent said one end of the generator housing and lying partially within the generator housing at generator fan high suction pressure and partially outside the generator housing at ambient pressure with the end wall located axially between opposite ends of the bearing housing, a method of minimizing or eliminating oil leakage from the bearing housing into the generator housing comprising the steps of:

isolating the bearing housing from the high suction pressure of the generator fan by retrofitting a seal between (i) the rotor adjacent said one end thereof and at a location axially inwardly of the bearing and (ii) the end wall thereby exposing the entirety of the bearing housing to ambient pressure.

2. A method according to claim 1 wherein the generator includes a lubrication oil system having a lubrication oil vapor extractor and employing the lubrication oil vapor extractor to apply a suctionpressure to the oil in the bearing.

3. A method according to claim 1 wherein the generator has a vapor extractor operable at high suction pressure comparable to the suction pressure generated by the cooling fan within the generator housing for removing oil vapors from the bearing housing, the further step of disconnecting the high suction pressure vapor extractor from the bearing housing to remove the high pressure suction from the bearing housing.

4. In an electrical generator according to claim 1 including forming an enlarged opening in the end wall of the generator housing and inserting a partition between the enlarged opening and the rotor at said axially inward location of the bearing.

5. In an electrical generator according to claim 4 including forming the partition in a generally frustoconical configuration and providing a seal about the rotor at a smaller diameter end of the partition.

* * * * *